United States Patent [19]
Bernhardsson

[11] Patent Number: 5,829,210
[45] Date of Patent: Nov. 3, 1998

[54] METHOD TO PREPARE FOR THE INSTALLATION OF UNITS USING CHANNELS IN DWELLINGS, AND MULTIPLE CHANNEL MEANS TO PERFORM SAID METHOD

[76] Inventor: Goran Bernhardsson, Avenue des Erables 5, S-1640 Rhode-St-Genese, Belgium

[21] Appl. No.: 600,996
[22] PCT Filed: Feb. 10, 1995
[86] PCT No.: PCT/SE95/00142
§ 371 Date: Mar. 5, 1996
§ 102(e) Date: Mar. 5, 1996
[87] PCT Pub. No.: WO95/22029
PCT Pub. Date: Aug. 17, 1995

[30] Foreign Application Priority Data
Feb. 10, 1994 [SE] Sweden .............................. 9400445-4

[51] Int. Cl.⁶ ..................................................... E04C 2/52
[52] U.S. Cl. ...................... 52/220.8; 52/220.5; 52/220.1; 454/233; 454/236; 454/289; 454/903
[58] Field of Search .............................. 52/220.1, 220.5, 52/220.6, 220.8; 454/233, 270, 243, 247, 236, 903, 289, 306

[56] References Cited

U.S. PATENT DOCUMENTS

| | | |
|---|---|---|
| 2,971,538 | 2/1961 | Brumbach . |
| 3,383,456 | 5/1968 | Kosak . |
| 4,050,205 | 9/1977 | Ligda .................................. 52/220.1 X |
| 4,612,746 | 9/1986 | Higgins .................................. 52/220.5 |
| 4,775,001 | 10/1988 | Ward et al. .......................... 454/306 X |
| 4,962,884 | 10/1990 | Choi ..................................... 454/289 X |
| 4,993,484 | 2/1991 | Neuzil ................................. 454/306 X |
| 5,295,904 | 3/1994 | Aoki et al. .......................... 454/306 X |
| 5,467,565 | 11/1995 | Bowman et al. ...................... 52/220.1 |
| 5,477,649 | 12/1995 | Bessert ............................... 52/220.5 X |
| 5,483,776 | 1/1996 | Poppe ................................. 52/220.5 X |

*Primary Examiner*—Christopher Kent
*Assistant Examiner*—Yvonne Horton-Richardson
*Attorney, Agent, or Firm*—Young & Thompson

[57] ABSTRACT

A method of preparing an installation of channel using units in several rooms on the one and same floor so as to allow a subsequent completion of units with multiple channel elements. Onto a flooring support between a distributing central unit and the rooms on the floor, the flexible channel elements which are enclosed in an exterior casing, are enclosed. These channel elements are a) a separate channel or conduit for the flow of a hot or cold brine to and from radiators in the rooms, b) channels for supplying electricity and/or for communicating with the units; and c) a channel space for fresh air between the elements. The floor is then finished to cover the multiple channel elements.

3 Claims, 3 Drawing Sheets

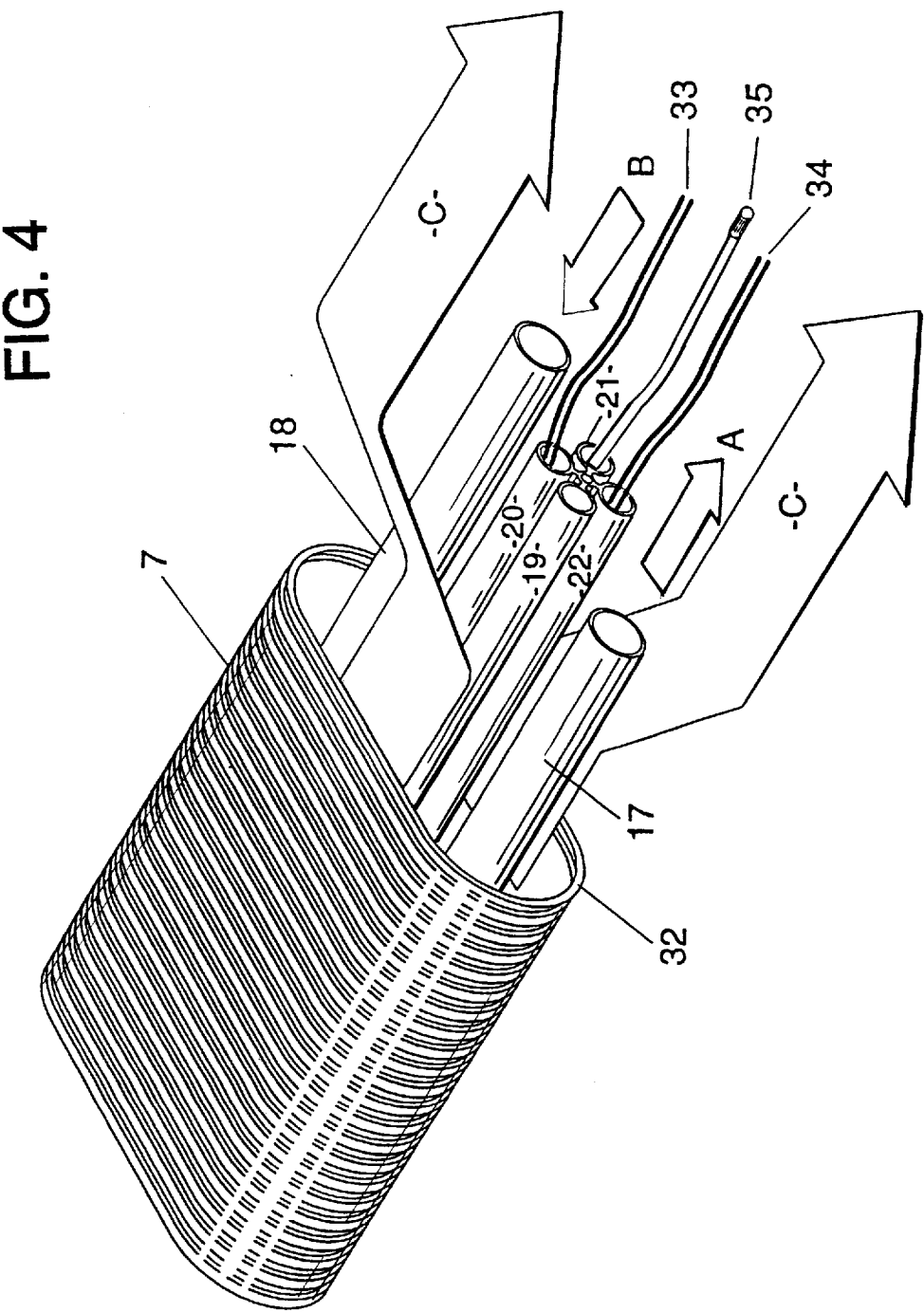

5,829,210

METHOD TO PREPARE FOR THE INSTALLATION OF UNITS USING CHANNELS IN DWELLINGS, AND MULTIPLE CHANNEL MEANS TO PERFORM SAID METHOD

FIELD OF THE INVENTION

The present invention relates to a method to prepare for the installation of units using channels in dwellings, e.g. climate plants or alarm units to one or to several room units. The invention also relates to multiple channel means to perform said method. The technique according to the invention will also allow a subsequent and simple completion of units. "Channel using units" involve such units which themselves consist of, or include a channel, such as means for intake air, but also alarm systems or antenna systems which need a cable to be brought through channels to reach several rooms units are included.

BACKGROUND OF THE INVENTION

The background of the invention can be seen from four different aspects.

Firstly the cost to build a modern dwelling is large, whereas all the possiblities regarding heating, air conditioning, ventilation, antenna systems and maybe installations for alarm or monitoring purposes are made from the very beginning. This is especially the case if all the possibilities shall exist for all the rooms.

Secondly, the building costs can to an essential part be found in lost time when different craftsmen/entrepeneurs shall be phased in into the building process.

Thirdly, it is presumed that an increased conciousness about the necessity to household with finite natural resources will lead to future buildings in the central Europe being built tighter and with a more efficient insulation. This in turn will increase the demands onto the ventilation systems. More simple and cheaper heating and comfort cooling systems and ventilation techniques are presumed to have a growing market. Effective and small scale heating systems using simple heat pump techniques with ground based low temperature stores and a recovering of the energy from waste air will soon be both economically and ecologically profitable alternatives.

Fourthly, such channel using units as monitoring and alarm systems, which can make a long and safe living for older people in a well known home environment possible, are examples of such techniques which sometime in the future can be expected to come to use in a dwelling. The advantage of having older people living in well-known surroundings is simply that daily routines work without too concious efforts. When changing in the surroundings occur, e. g. when moving from one's own dwelling to a home for the aged, it happens that the elder people will be completely dependent upon help also for the simplest daily routines. It is very difficult for elder people to learn new auto behaviour patterns. The neuron net structures in the brain for old and known behaviours which worked in the old home surroundings can not manage the change to new surroundings with new impressions. Also for these reasons it is an advantage to prepare dwellings for a subsequent simple installation or completion with one or several channel using units.

SUMMARY OF THE INVENTION

Thus the main object of the present invention is to make a direct or subsequent completing installation of channel using units possible in a simple way already when dwellings are built and at the same time decrease waste time in the building process.

This object will be obtained by the method according to the characterizing parts of the appended patent claims.

By arranging flexible channel means onto a supporting under-structure between a distributing central and the existing room units, which channel means are in an outer collecting casing, and which in itself contains;

a) separate channels or conduits for the flowing of a heating or cooling brine flow to and from radiators in the rooms, b) channels for electricity and/or communicating units, and c) a channel space for fresh air, whereupon the floor is finished and covers the multichannel means, from the beginning one can create possibilities for a future choice depending upon need, economy and desire from the residents.

As this arrangement of channel means can take place in connection to the arrangement of conduits for the necessary heating system and as this occurs without any extra labour, the method according to the invention is both a more efficient way to build and gives possibilities to a future freedom of choice for the residents.

BRIEF DESCRIPTION OF THE DRAWINGS

The invention will now be briefly described in connection to the drawings, where;

FIG. 4 is a perspective view of a preferred embodiment of the multiple channel means according to the invention.

DETAILED DESCRIPTION OF THE INVENTION

Figure 1:
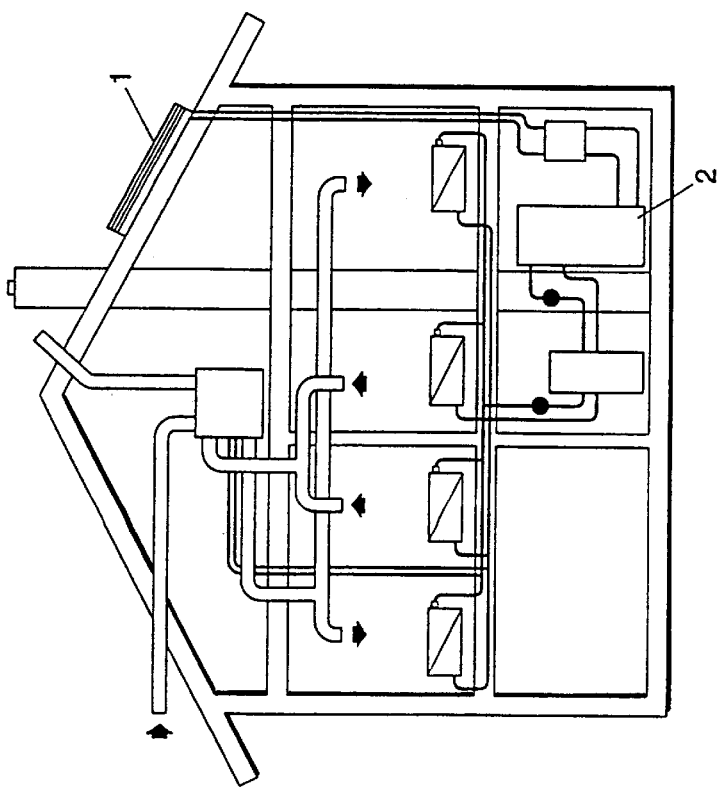
FIG. 1 is a diagrammatic view of an ordinary climate plant in a modern bungalow with basement and with a sun heating system used for heating tapwater.

FIG. 1 shows an ordinary climate plant in a modern bungalow with basement. This way to build a house demands, to achieve an optimal efficiency, that the different building entrepeneurs will be phased in into the building process at the right moment. These phasing in is difficult to achieve. Thus it is also difficult to change components subsequently and it is also difficult to inspect and keep the ventilation channels clean. In FIG. 1 a roof mounted sun collector 1 and in the basement a short term store 2 for sun heated water are shown. The water accumulator may be substituted against a salt store increasing the possibilities to store sun heat for a longer period of time. Thus it is just possible to store a limited amount of high temperature energy (about 50°–75°) for about a week.

Figure 2:
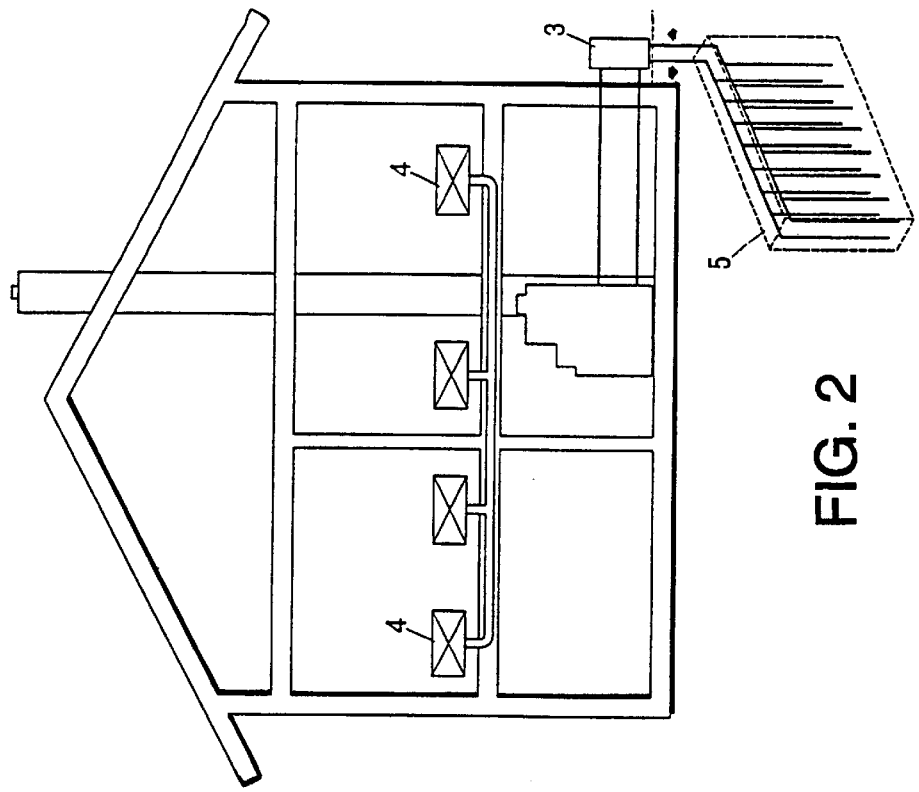
FIG. 2 is a diagrammatic view of a climate plant in accordance with the present invention installed in a bungalow with basement and with a simple heat pump system with a low temperature ground heat store.

In FIG. 2 is shown that the present invention has a minor interference with the building itself. Channels for ventilating vasted air passing through an attic floor structure have been avoided by passing the vaste air directely in connection to soil pipes in the kitchen and in the sanitary accomodations and further down to a heat exchanger.

Instead of using solar panels on the roof a possibility to use an outside heat pump 3 is shown. The condensing circuit of the heat pump can bring low temperature heat to a brine circulating through fan assisted indoor radiators 4. A small ground based energy store 5 is used as storing facility having a relatively big heat efficiency at low temperatures. The ground storage can also be used as a cold sink for comfort cooling during the summer. During the summer the living part of the house can be used as a heat collector to store heat in the ground storage. During a low demand for cooling this indoor cooling can take place without a reverse running of the heat pump, i.e. as a refrigerating compressor. The technique to use sun energy shown in FIG. 2 can store sun energy at low temperatures and use the major part of this low temperature energy six months later.

FIG. 3a is a perspective view of a floor structure 6 with multiple channels means 7a, 7b running from a distributing unit 8 to the different room units. Multiple channel means 7 are arranged in an insulation layer 9 onto the flooring structure 6. A covering layer 10 which can be moulded will cover the multiple channel means 7. Onto the layer 10 there is an ordinary coating 11. The multiple channel means 7 proceed from a floor distributing unit 8. Pipes 14 and 16 for a brine, conduits/cables 15 for electricity, antenna, alarm, etc leave the outer casing 13 of a vertical delivery means 12 passing through the flooring structure 6. The delivery means 12 will also carry ventilating air from the central floor distributing unit 8. From there the brine is distributed and is brought to and from each room unit in the pipes 17, 18, respectively in the multiple channel means 7. The pipe and cable means can be brought to each room unit through the channels 19–22.

The multiple channel means 7 leads to a connection unit 23 in the room unit. From this connection unit another connection can be made to the radiating unit 24, which may be fan assisted. This enables a relatively high power output at low temperature at the same time as the radiating unit can be made small. Cover means 25–27 can be removed from the connection unit 23 to expose the ends of the channels 19–22. Unless cable or pipe means are not already there, this can easily be done by using the difference between under and over, pressure at the feeding end and at the receiving end, respectively. This technique is previously known. It works in such a way that a moveable plug means, being for the most part sealed towards the inner surface of the channel means, by a pullable string and with the influence of air pressure will be fed from e.g. the floor distributing unit 8 to the connection unit 23 at the radiator 24. The string can be relatively light and not very strong and need just be used to draw a wire etc. between the radiator and the floor distributing unit. To this wire a cable or conduit means can be attached and with a great degree of safety the cable or conduit can be pulled through the multiple channel means and in the separate channel thereof.

Figure 3:
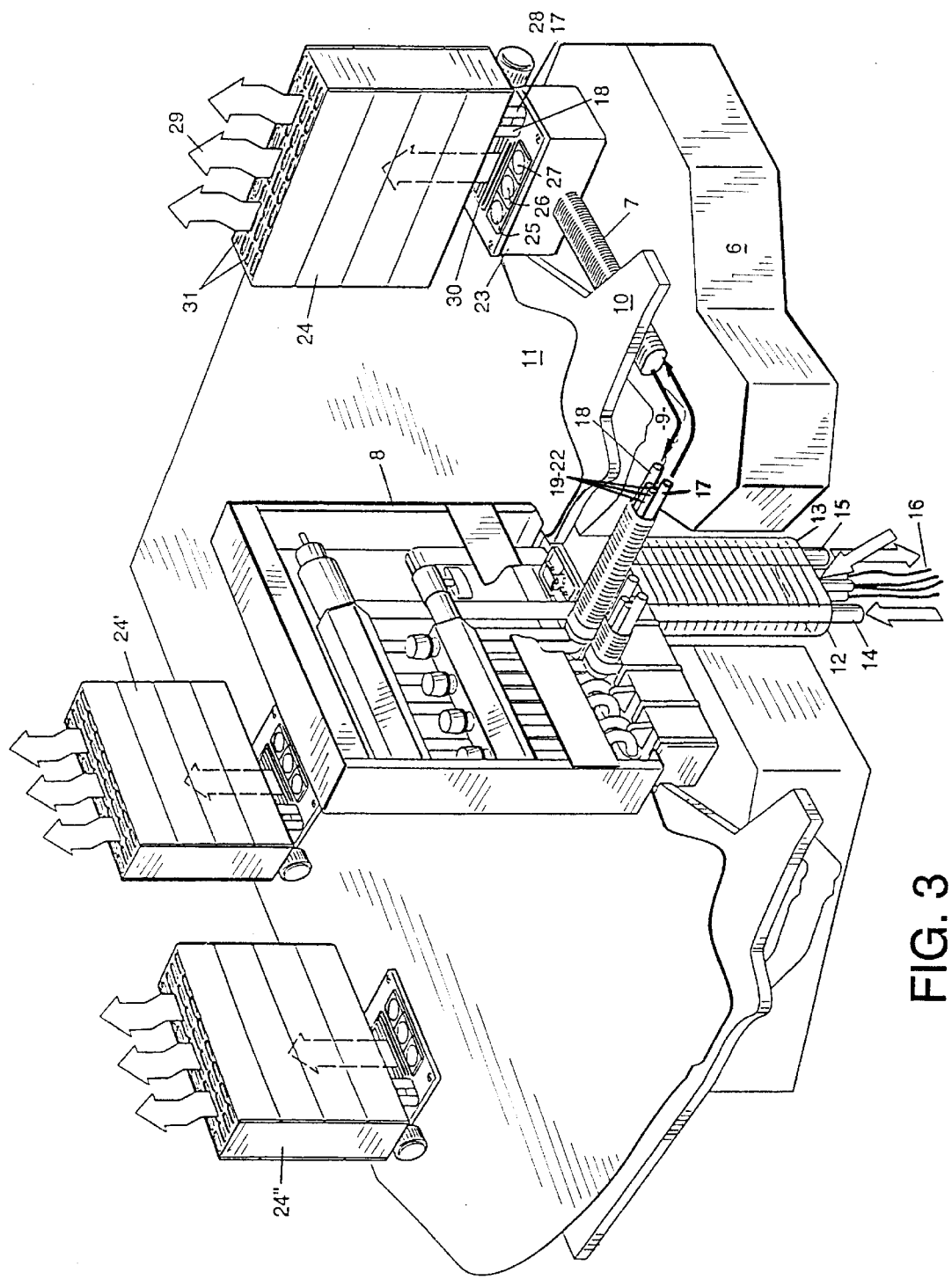
FIG. 3 is a perspective view of a floor structure with multiple channel means extending from a central floor distributing unit to several room units.

The radiator unit 24 can have regulator means 28 in the shape of a thermostat valve. The air flow 29 from the radiator unit will first flow through openings 30 in the connection unit 23 and passes the radiator 24 and out through openings 31 in the upper part of the radiator 24. Air filter means and/or ionizing means can be arranged at the outflow opening 30. In FIG. 3 only one of the radiating units 24 has been described. The connection of the two other shown radiator units 24' and 24" to the central floor distributing unit 8 is the same as above.

In FIG. 4 a perspective view of a preferred embodiment of the multiple channel means 7 according to the invention is shown. It has an exterior casing 32 admitting a flexible of the channel means 7. Pipes 17 and 18 bring hot or cold brine towards the radiator means 24 in the direction of the arrow A and back in the direction of the arrow B. The conduits may have a heat insulation layer, but can be non-insulated as well to transfer the heat to the inflowing fresh air heading towards the radiator unit 24 (the arrows C). Conduit and cable means 33–35 pass to each room unit in the channels 20–22. The channel 19 has been shown empty for a future use.

I claim:

1. Floor structure comprising: a plurality of channel means arranged between a distributing unit and a connection unit in several rooms on the same floor, each of said channel means comprising:

a) separate first conduits structured and arranged for the flow of hot or cold brine through said first conduits to and from a radiator in the rooms, b) a plurality of second conduits structured and arranged to contain electrical cables and communication cables for supplying electricity and for providing communication with other units, and c) a channel space within said channel means and external of said first and second conduits for flowing fresh air through the channel means.

2. Method of preparing an installation of channel using units in several rooms on the one and same floor, so as to allow a subsequent completion of units, the method comprising:

arranging onto a flooring support between a central distributing unit and the rooms on said floor a plurality of flexible channel means enclosed in a flexible exterior casing, each channel means comprising:

a) separate first conduits structured and arranged for the flow of hot or cold brine through said first conduits to and from radiators in the rooms, b) a plurality of second conduits structured and arranged to contain electrical cables and communication cables for supplying electricity and for providing communication with other units; and c) a channel space within said channel means and external of said first and second conduits for flowing fresh air through the channel means; and finishing the floor with a covering layer so as to cover the plurality of channel means.

3. Method according to claim 2, further comprising applying a coating onto the finished floor, and leading each channel means to a connection unit in the coated floor, the connection unit constructed and arranged for connection to a radiator.

* * * * *